US006437088B1

(12) United States Patent
Duan

(10) Patent No.: US 6,437,088 B1
(45) Date of Patent: Aug. 20, 2002

(54) PROCESS FOR PRODUCING POLYESTER WITH COATED TITANIUM DIOXIDE

(75) Inventor: Jiwen F. Duan, Apex, NC (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/929,436

(22) Filed: Aug. 14, 2001

(51) Int. Cl.$^7$ ................................................ C08G 63/78
(52) U.S. Cl. ..................... 528/279; 528/274; 528/277; 528/280; 528/281; 528/282; 528/285; 528/286; 528/301; 528/302; 528/308; 528/308.6; 524/81; 524/780; 524/783; 524/785; 524/786; 524/789
(58) Field of Search .................... 528/274, 277, 528/279, 280, 281, 282, 285, 286, 301, 302, 308, 308.6; 524/81, 780, 783, 785, 786, 789

(56) References Cited

PUBLICATIONS

Japanese Patent Abstract JP63063746.
Japanese Patent Abstract JP05132611.
Japanese Patent Abstract JP06025515.
Japanese Patent Abstract JP56042685.
Japanese Patent Abstract JP60035023.

Primary Examiner—Samuel A. Acquah

(57) ABSTRACT

A process for producing a polyester. The process comprises polymerizing a polymerization mixture comprising (i) a carbonyl compound or an oligomer of a carbonyl compound and (ii) a glycol, in the presence of a titanium catalyst composition, to produce the polyester, wherein a coated titanium dioxide comprising a titanium dioxide and a coat is added before or during the polymerizing.

19 Claims, No Drawings

PROCESS FOR PRODUCING POLYESTER WITH COATED TITANIUM DIOXIDE

FIELD OF THE INVENTION

This invention relates to a process for producing a polyester. More specifically, this invention relates to a process for polymerizing a carbonyl compound and a glycol in the presence of a coated titanium dioxide and a titanium catalyst composition.

BACKGROUND OF THE INVENTION

Polyesters such as, for example, polyethylene terephthalate, polytrimethylene terephthalate, and polybutylene terephthalate, generally referred to as "polyalkylene terephthalates," are a class of important industrial polymers. They are widely used in fibers, films, and molding applications.

There are several known methods for producing polyester. In one method, polyester is produced by transesterification of an ester, such as dimethyl terephthalate, (DMT) with a glycol followed by polycondensation. In another known process, an acid such as terephthalic acid (TPA) is directly esterified with a glycol followed by polycondensation. A catalyst is typically used to catalyze the esterification, transesterification, and/or polycondensation reactions.

Antimony is often used as a catalyst for the polymerization and/or polycondensation reactions. Unfortunately, antimony-based catalysts suffer from several shortcomings. Antimony forms insoluble antimony complexes that plug fiber spinnerets. As a result, during fiber spinning, frequent shutdowns are necessary to wipe the spinnerets clean of precipitated antimony compounds. In addition, there are increased environmental and regulatory controls, especially in food contact applications, due to the toxic characteristics of antimony-based catalysts.

Titanium catalysts, which are less toxic than antimony-based catalysts, have been studied extensively for use as catalysts in these esterification, transesterification, and polycondensation reactions. Titanium catalysts reduce the amount of inorganic solids in polyester formed using antimony-based catalysts, thereby reducing pack pressure in spinning and haziness in the bottle resin. Titanium catalysts also reduce spinning breaks and improve the yield in fiber spinning.

During the production of polyester, uncoated titanium dioxide ($TiO_2$) has been widely used as a delusterant. It has been found, however, that uncoated titanium dioxide deactivates the titanium catalyst. As a result of this deactivation, it becomes necessary to dramatically increase the amount of titanium catalyst to achieve the same degree of polymerization as the amount of titanium catalyst used without a titanium dioxide delusterant.

There is a need for a new process for producing polyester wherein the degree of deactivation of the titanium catalyst caused by titanium dioxide is reduced or eliminated.

SUMMARY OF THE INVENTION

The present invention provides a process for producing a polyester, wherein deactivation of the titanium catalyst by a titanium dioxide is reduced or eliminated.

The present invention provides a process for producing a polyester. The process comprises polymerizing a polymerization mixture comprising (i) a carbonyl compound or an oligomer of a carbonyl compound and (ii) a glycol, in the presence of a titanium catalyst composition, to produce the polyester, wherein a coated titanium dioxide comprising a titanium dioxide and a coat is added before or during the polymerizing.

The coat of the coated titanium dioxide can comprise an aluminum compound, a silicon compound, a manganese compound, a phosphorous compound, an antimony compound, a cobalt compound, an organic compound, or a combination thereof. In one embodiment, the coat comprises at least one of an aluminum oxide, a silicon oxide, a potassium oxide, an antimony oxide, or a manganese oxide. In another embodiment, the coat comprises polyethylene oxide, trimethylolpropane, polyvinylpyrrolidone, polyvinyl alcohol, or a combination of two or more thereof.

In one embodiment, the titanium dioxide is 70 to 99.5% by weight of the coated titanium dioxide. In another embodiment, the coat is 0.5 to 30% by weight of the coated titanium dioxide.

DETAILED DESCRIPTION OF THE INVENTION

The invention provides a process for producing a polyester which comprises polymerizing a polymerization mixture comprising (i) a carbonyl compound or an oligomer of said carbonyl compound and (ii) a glycol, in the presence of a titanium catalyst composition, to produce said polyester. In the process of the invention, a coated titanium dioxide comprising titanium dioxide and a coat is added before or during the polymerizing.

The coated titanium dioxide of the invention comprises a coat and titanium dioxide. The titanium dioxide can be anatase or rutile, and is partially or completely coated with the coat. The coat is made of an organic and/or an inorganic material. Suitable coating materials include, but are not limited to, an aluminum compound, a silicon compound, a manganese compound, a phosphorous compound, an antimony compound, a cobalt compound, an organic compound such as polyethylene oxide and/or trimethylolpropane, and combinations of two or more thereof. Preferably, the coat is 0.5 to 30% by weight of the coated titanium dioxide, more preferably 2 to 20% by weight, and most preferably 3 to 10% by weight.

Examples of coating compounds include, but are not limited to, an aluminum oxide, a silicon oxide, a potassium oxide, an antimony oxide, a manganese oxide, polyethylene oxide, and trimethylolpropane. The coat of the coated titanium dioxide is 0.5% to 30% by weight of the coated titanium dioxide.

In one embodiment, the coat of the coated titanium dioxide comprises one or more of the following, such that the coat of the coated titanium dioxide is 0.5% to 30% by weight of the coated titanium dioxide: (i) 0.01% to 10% $Al_2O_3$, preferably 0.01% to 5%; (ii) 0.01 to 20% $SiO_2$, preferably 0.01 to 10%; (iii) 0.01 to 2% $P_2O_5$, preferably 0.01 to 1%; (iv) 0.01 to 1% $Sb_2O_3$; (v) 0.01 to 1% MnO; (vi) 0.01 to 20% of an organic compound such as polyethylene oxide or trimethylolpropane, preferably 0.01 to 5%.

The coated titanium dioxide can be in the form of a slurry that comprises coated titanium dioxide in a glycol and/or water. The concentration of coated titanium dioxide in the slurry can be 1 to 80%, preferably 10 to 60%, most preferably 20 to 30% by weight.

In one embodiment, the coated titanium dioxide slurry includes a glycol having 1 to 10, preferably 1 to 8, and most preferably 1 to 4 carbon atoms per molecule, such as an alkylene glycol, a polyalkylene glycol, an alkoxylated glycol, or combinations thereof. Examples of suitable glycols include, but are not limited to, ethylene glycol, propylene glycol, isopropylene glycol, butylene glycol, 1-methyl propylene glycol, pentylene glycol, diethylene glycol, triethylene glycol, polyoxyethylene glycol, polyoxypropylene glycol, polyoxybutylene glycol and combinations of two or more thereof. The most preferred glycols are ethylene glycol, 1,3-propanediol, and butylene glycol, which can be used in the production of commercially important polyethylene terephthalate, polypropylene terephthalate, and polybutylene terephthalate.

The slurry of coated titanium dioxide can be prepared using techniques well known to those skilled in the art. The slurry can be prepared in any suitable vessel or container by techniques well known to those skilled in the art, such as wet milling, sand milling, pearl milling, ball milling, colloid milling, homogenization, centrifugation, agitation, filtration, and combinations of two or more thereof.

Optionally, the coated titanium dioxide slurry can further include a dispersing agent. The coated titanium dioxide can be mixed in the presence of a dispersing agent, such as potassium tripolyphosphate, potassium pyrophosphate, polyvinylpyrrolidone, and/or polyvinyl alcohol, with a glycol to form a slurry.

Examples of suitable dispersing compounds include, but are not limited to, a polyphosphoric acid or a salt thereof, a phosphonate ester, a pyrophosphoric acid or salt thereof, a pyrophosphorous acid or salt thereof, polyvinylpyrrolidone, polyvinyl alcohol, and combinations of two or more thereof. The polyphosphoric acid can have the formula of $H_{n+2}P_nO_{3n+1}$ in which n is $\geq 2$. The phosphonate ester is selected from the group consisting of $(R^1O)_2P(O)ZCO_2R^1$, di(polyoxyethylene) hydroxymethyl phosphonate, and combinations thereof; wherein each $R^1$ is independently selected from hydrogen, a $C_{1-4}$ alkyl, and combinations thereof; and Z is selected from a $C_{1-5}$ alkylene, a $C_{1-5}$ alkylidene, and combinations thereof. Presently preferred dispersing agents include potassium tripolyphosphate, potassium pyrophosphate, and triethyl phosphonoacetate.

The coated titanium dioxide slurry can be made in a batch process that is simple and inexpensive to operate. The slurry can also be carried out by continuous methods which are well known to one skilled in the art.

In one embodiment, the quantity of the coated titanium dioxide that is added to the polymerization mixture is 0.001 to 10 weight %, preferably 0.03 to 2.0 weight % of the polymerization mixture. The coated titanium dioxide can be added before, during, or after the esterification or transesterification process of the carbonyl compound or the oligomer of the carbonyl compound. The coated titanium dioxide can also be added before or during the polycondensation of the carbonyl compound or the oligomer of the carbonyl compound.

The titanium catalyst composition used in the process of the invention can be any of those titanium catalysts conventionally used to produce a polyester. The titanium catalyst composition can be in a solid form, or the titanium catalyst composition can be a slurry or solution that further comprises glycol and/or water.

In one embodiment, the titanium catalyst composition comprises a tetraalkyl titanate, also referred to as a titanium tetrahydrocarbyloxide, which is readily available. Examples of suitable tetraalkyl titanates include those having the formula of $Ti(OR)_4$, wherein each R is individually selected from an alkyl, cycloalkyl, alkaryl, hydrocarbyl radical containing from 1 to about 30, preferably 2 to about 18, and most preferably 2 to 12 carbon atoms per radical. Titanium tetrahydrocarbyloxides in which the hydrocarboxyl group contains from 2 to about 12 carbon atoms per radical which is a linear or branched alkyl radical are preferred because they are relatively inexpensive, more readily available, and effective in forming the solution. Suitable tetraalkyl titanates include, but are not limited to, titanium tetraethoxide, titanium tetrapropoxide, titanium tetraisopropoxide, titanium tetra-n-butoxide, titanium tetrahexoxide, titanium tetra 2-ethylhexoxide, titanium tetraoctoxide, and combinations of two or more thereof. The titanium tetrahydrocarbyloxides are well known to one skilled in the art and are provided, for example, in U.S. Pat. Nos. 6,066,714 and 6,166,170, the descriptions of which are incorporated herein by reference. Examples of commercially available organic titanium compounds include, but are not limited to, TYZOR® TPT and TYZOR® TBT (tetra isopropyl titanate and tetra n-butyl titanate, respectively) available from E. I. du Pont de Nemours and Company, Wilmington, Del., U.S.A.

The titanium catalyst composition can also comprise titanium glycolate, optionally in the presence of water. Titanium glycolate can be produced by contacting a titanium compound, such as tetraisopropyl titanate, with an alkyl glycol, such as ethylene glycol, 1,3-propanediol, or butylene glycol. The catalyst composition can also be a titanic acid having the formula $H_2TiO_3$, $TiO(OH)_2$, or $TiO_2 \cdot H_2O$, titanium dioxide, or combinations thereof.

According to an embodiment of the invention, the esterification, transesterification, or polymerization process can comprise contacting, optionally in the presence of a phosphorus compound and/or a cocatalyst, either (a) a titanium catalyst composition and a coated titanium dioxide slurry in a first glycol and/or water with a polymerization mixture comprising a carbonyl compound and a second glycol or (b) a titanium catalyst composition and a coated titanium dioxide slurry in a first glycol and/or water with an oligomer derived from a carbonyl compound and a second glycol under a condition effective to produce a polymer comprising repeat units derived from the carbonyl compound or its ester, first glycol, and second glycol. The second glycol can be the same or different from the first glycol. The presently preferred second glycol is ethylene glycol, 1,3-propanediol (propylene glycol), butylene glycol, or a combination of two or more thereof.

In the process of the invention, the titanium catalyst composition can be used as a polycondensation catalyst. Alternatively, the titanium catalyst composition can be present in the ester exchanger to accelerate the transesterification reaction or in the esterifier to accelerate the esterification reaction. Generally, the titanium catalyst composition is more active in the polycondensation reaction than the esterification or transesterification reactions. The proper level of titanium catalyst composition for esterification or transesterification can be an excess level for polycondensation. When titanium catalyst composition present in the esterifier or ester exchanger (transesterifier) is an excess for polycondensation, or when polycondensation is intended with a non-titanium catalyst such as antimony, part of or all of the titanium catalyst is preferably deactivated or inhibited after esterification or transesterification with a phosphorus compound to avoid discoloration of the polymer.

The titanium catalyst composition can further include a cocatalyst present in the range of about 0.001 to about 30,000 ppm by weight of the polymerization mixture comprising the carbonyl compound and glycol, preferably about 0.1 to about 1,000 ppm by weight, and most preferably 1 to 100 ppm by weight. Suitable cocatalysts include, for example, a cobalt cocatalyst, an aluminum cocatalyst, an antimony cocatalyst, a manganese cocatalyst, a zinc cocatalyst, or a combination of two or more thereof. Such cocatalysts are well known to those skilled in the art. In another embodiment, the cocatalyst comprises a cobalt/aluminum cocatalyst. Cobalt/aluminum catalysts comprise a cobalt salt and an aluminum compound, in which the mole ratio of aluminum to cobalt salt is in the range of from 0.25:1 to 16:1. Cobalt/aluminum catalysts are disclosed in U.S. Pat. No. 5,674,801, the disclosure of which is incorporated herein by reference. When a cocatalyst is present in the process of the invention, the cocatalyst can either be separate from or can be included as part of the titanium catalyst composition.

The titanium catalyst composition can also include additives which are well known in the art. For example, the titanium catalyst composition can include a stabilizer (i.e., a substance that prevents the titanium catalyst composition solution from gelling or precipitating), such as a phosphorous stabilizer compound, and/or a toner compound, such as a cobalt toner compound.

The titanium catalyst present in the polyester can cause increased degradation and yellowness in future processing. To reduce and/or eliminate degradation and yellowness in future processing, part or all of the titanium catalyst can be deactivated or inhibited after polymerization with a phosphorus compound to avoid discoloration of the polymer. Similarly, when manganese, zinc, cobalt, or other catalysts are used as an esterification or transesterification catalyst and the titanium catalyst is used as a polycondensation catalyst, these catalysts can be deactivated by the presence of a phosphorus compound. Accordingly, the titanium catalyst composition can also include a phosphorus compound.

Any phosphorus compound that can stabilize a titanium-glycol solution (i.e., can prevent the solution from gelling or precipitating) can be used to deactivate the catalyst. Examples of suitable phosphorus compounds include, but are not limited to, a polyphosphoric acid or a salt thereof, a phosphonate ester, a pyrophosphoric acid or salt thereof, a pyrophosphorous acid or salt thereof, and combinations of two or more thereof. The polyphosphoric acid can have the formula of $H_{n+2}P_nO_{3n+1}$ in which n is $\geq 2$. The phosphonate ester can have the formula of $(R^2O)_2P(O)ZCO_2R^2$ in which each $R^2$ can be independently hydrogen, a $C_{1-4}$ alkyl, or a combination thereof; and Z is a $C_{1-5}$ alkylene, a $C_{1-5}$ alkylidene, or combinations thereof, di(polyoxyethylene) hydroxymethyl phosphonate, and combinations of two or more thereof. The salt can be an alkali metal salt, alkaline earth metal salt, ammonium salt, or a combination of two or more thereof.

Illustrative examples of suitable phosphorus compounds include, but are not limited to, potassium tripolyphosphate, sodium tripolyphosphate, potassium tetra phosphate, sodium pentapolyphosphate, sodium hexapolyphosphate, potassium pyrophosphate, potassium pyrophosphite, sodium pyrophosphate, sodium pyrophosphate decahydrate, sodium pyrophosphite, ethyl phosphonate, propyl phosphonate, hydroxymethyl phosphonate, di(polyoxyethylene) hydroxymethyl phosphonate, methylphosphonoacetate, ethyl methylphosphonoacetate, methyl ethylphosphonoacetate, ethyl ethylphosphonoacetate, propyl dimethylphosphonoacetate, methyl diethylphosphonoacetate, triethyl phosphonoacetate, and combinations of two or more thereof.

In one embodiment, the titanium catalyst composition comprises a salt of a polyphosphoric acid having 0.001% to 10% by weight titanium, 50% to 99.999% by weight glycol, and 0% to 50% by weight water, in which the molar ratio of phosphorus to titanium is about 0.001:1 to 10:1.

According to the invention, a phosphorus compound can be present in the process before, during, or after the carbonyl compound or oligomer of the carbonyl compound is esterified or transesterified. Similarly, the phosphorous compound can be present before, during, or after polycondensation.

Any carbonyl compound which, when combined with a glycol, can produce a polyester can be used. Such carbonyl compounds include, but are not limited to, acids, esters, amides, acid anhydrides, acid halides, salts of carboxylic acid, oligomers or polymers having repeat units derived from an acid, or combinations of two or more thereof. The presently preferred acid is an organic acid such as a carboxylic acid or ester thereof. The oligomer of a carbonyl compound such as terephthalic acid and glycol generally has a total of about 2 to about 100 repeat units, preferably from about 2 to about 20 repeat units, derived from the carbonyl compound and glycol. The oligomer of the carbonyl compound, such as terephthalic acid, can be produced by contacting terephthalic acid, its ester, or combinations thereof with a second glycol under esterification, transesterification, or polymerization conditions well known to one skilled in the art to produce a total of about 2 to about 100, preferably from about 2 to about 20 repeat units derived from the terephthalic acid and glycol.

The organic acid or ester thereof can have the formula of $R^2O_2CACO_2R^2$ in which each $R^2$ independently can be (1) hydrogen or (2) a hydrocarbyl radical in which each radical has 1 to about 30, preferably about 3 to about 15 carbon atoms per radical which can be alkyl, alkenyl, aryl, alkaryl, aralkyl radical, or combinations of two or more thereof, and in which A is an alkylene group, an arylene group, alkenylene group, or combinations of two or more thereof. Each A has about 2 to about 30, preferably about 3 to about 25, more preferably about 4 to about 20, and most preferably 4 to 15 carbon atoms per group. Examples of suitable organic acids include, but are not limited to, terephthalic acid, isophthalic acid, napthalic acid, succinic acid, adipic acid, phthalic acid, glutaric acid, oxalic acid, and combinations of two or more thereof. Examples of suitable esters include, but are not limited to, dimethyl adipate, dimethyl phthalate, dimethyl terephthalate, dimethyl glutarate, and combinations of two or more thereof. The preferred organic acid is terephthalic acid or its ester dimethyl terephthalate.

The molar ratio of the glycol to carbonyl compound is selected to effect the production of an ester or polyester. Generally, the ratio of glycol to carbonyl can be in the range of from about 1:1 to about 10:1, preferably about 1:1 to about 5:1, and most preferably 1:1 to 4:1.

In one embodiment, the polyester is produced in a temperature in the range of from about 150° C. to about 500° C., preferably about 200° C. to about 400° C., and most preferably 250° C. to 300° C. under a pressure in the range of from about 0.001 to about 1 atmosphere (0.1 to 101.3 kPa) for a time period of from about 0.2 to about 20, preferably about 0.3 to about 15, and most preferably 0.5 to 10 hours.

The process of the invention can also be carried out using any of the conventional melt or solid state techniques and in the presence or absence of a toner compound to reduce the color of a polyester produced. Examples of toner compounds include, but are not limited to, cobalt aluminate, cobalt acetate, Carbazole violet (commercially available from Hoechst-Celanese, Coventry, R.I., U.S.A., or from Sun Chemical Corp, Cincinnati, Ohio, U.S.A.), Estofil Blue S-RLS and Solvent Blue $_{45}$TM (from Sandoz Chemicals, Charlotte, N.C., U.S.A), CuPc Blue (from Sun Chemical Corp, Cincinnati, Ohio, U.S.A.). These toner compounds are well known to one skilled in the art and the description of which is omitted herein. The toner compound can be used with the catalyst disclosed herein in the amount of about 0.1 ppm to 1000 ppm, preferably about 1 ppm to about 100 ppm, based on the weight of polyester produced.

The invention process can also be carried out using any of the conventional melt or solid state techniques and in the presence or absence of an optical brightening compound to reduce the yellowness of the polyester produced. Examples of optical brightening compounds include, but are not limited to, 7-naphthotriazinyl-3-phenylcoumarin (LEUCOPURE EGM, from Sandoz Chemicals, Charlotte, N.C., U.S.A.), 4,4'-bis(2-benzoxazolyl) stilbene (EASTOBRITE, from Eastman Chemical, Kingsport, Tenn., U.S.A.). These optical brightening compounds are well known to one skilled in the art and the description of which is omitted herein. The optical brightening compound can be used with the catalysts disclosed herein in the amount of about 0.1 ppm to 10,000 ppm, preferably about 1 ppm to about 1000 ppm, based on the weight of polyester produced.

EXAMPLES

The following examples are provided to further illustrate the invention and are not to be construed as to unduly limit the scope of the invention. All TYZOR® products noted in the examples were obtained from DuPont, Wilmington, Del., U.S.A. All concentrations (% or ppm (parts per million)), unless otherwise indicated, are by weight.

Intrinsic viscosity (I.V.) was measured by solution viscosity in hexafluoroisopropanol (HFIP). Weighed polymer sample was dissolved in HFIP to make 4.75% solution. The drop time of the solution at 25° C. was measured using a constant volume viscometer in an Octavisc® auto viscometer system.

Color was measured in a Hunterlab calorimeter D25M-9, wherein L color represents brightness for which higher value is desirable and b color represents yellowness for which lower value (less yellow) is desirable.

The composition of titanium dioxide used in these examples are listed in Table 1. The uncoated anatase titanium dioxide LW-S-U and coated anatase titanium dioxides LC-S and LOCR-SM were obtained from Sachtleben Chemie GmbH of Duisburg, Germany. The coated rutile titanium dioxides, TI-PURE titanium dioxides R-700, R-900, R-706, R-902, R-960, and R-931, were obtained from E. I. du Pont de Nemours and Company of Wilmington, Del., U.S.A. In addition, a coated rutile titanium dioxide designated R-668 which has a 3% silicon dioxide coating was used.

TABLE 1

| $TiO_2$ type | $TiO_2$ % | $Al_2O_3$ % | $SiO_2$ % | $P_2O_5$ % | $Sb_2O_3$ % | MnO % |
|---|---|---|---|---|---|---|
| LW-S-U | >99 | | | | | |
| LC-S | 97.1 | 1.49 | | | | |
| LOCR-SM | 94.8 | 1.40 | 1.09 | 1.10 | 0.36 | 0.27 |
| R-700 | 96 | 3.1 | | | | |
| R-900 | 94 | 4.3 | | | | |
| R-706 | 93 | 2.4 | 3.0 | | | |
| R-902 | 91 | 4.3 | 1.4 | | | |
| R-960 | 89 | 3.3 | 5.5 | | | |
| R-931 | 80 | 6.4 | 10.2 | | | |
| R-668 | 96 | | 3 | | | |

Example 1

This example illustrates that titanium catalyst is deactivated by uncoated titanium dioxide, but not by the coated titanium dioxides. Polyethylene terephthalate resin was produced in a small batch reactor from oligomer and ethylene glycol. The polyester esterification, polycondensation, and spinning processes used are well known to one skilled in the art and, thus, only a brief description is provided.

The oligomer was produced from terephthalic acid (TPA) in a continuous pilot plant. A TPA slurry tank was continuously charged with about 47 kg/hour of TPA and ethylene glycol. The charge rate was controlled by a powder screw feeder to obtain a desired polymer flow rate of 54.4 kg/hour. Virgin ethylene glycol was used so that the oligomer contained no catalyst, the ethylene glycol flow rate was controlled by a mass flow meter such that the molar ratio of ethylene glycol and TPA was 2.2. The temperature in the slurry tank was about 80° C. The TPA slurry was injected into a recirculating esterifier at a rate to keep desired polymer flow rate and constant oligomer liquid level in the esterifier. The temperature in the esterifier was controlled at 284° C. The vapor from the esterifier was condensed and separated into ethylene glycol and water, which was then mixed with virgin glycol and charged to the TPA slurry tank. The oligomer from the esterifier had a degree of polymerization of 5 to 10, and did not contain antimony or titanium dioxide.

The batch reactor was a glass kettle of 1 liter and the heating was automatically controlled with a thermometer. The speed of a paddle type agitator was controlled and the torque was measured. Vacuum in the reactor was created by a vacuum pump. The vapor was condensed by water and dry ice.

The oligomer from the esterifier (400 grams), ethylene glycol (120 grams, including ethylene glycol in all additives), titanium dioxide 20% in ethylene glycol slurry (0 g, 6.0 g, or 30 g to make polymer containing $TiO_2$ 0%, 0.3%, or 1.5%), titanium catalyst tetraisopropyl titanate (TPT, from E. I. Du Pont, Wilmington, Del., U.S.A., 0.017 g to 0.071 g to make polymer containing Ti 7 ppm to 30 ppm), and phosphorous compound $H_3PO_4$ (1% $H_3PO_4$ in ethylene glycol solution, 0.885 g to make polymer containing P 7 ppm), or di(polyoxyethylene) hydroxymethyl phosphonate (HMP, from Akzo Nobel, Louisville, Ky., U.S.A., 0.094 g to make polymer containing P 20 ppm), or triphenyl phosphite (TPP, from Aldrich, Chemical, Milwaukee, Wis., U.S.A., 0.160 g to make polymer containing P 40 ppm) were charged to the reactor at room temperature. The mixture was agitated at 60 revolution/min and heated at 265° C. for 30 minutes or until the oligomer dissolved. The vacuum in the kettle was reduced to 120 mm Hg (16 kPa) and temperature maintained at 265° C. for 10 minutes, then heated at 275 ° C. for 20 minutes, and heated at 280° C. with vacuum 30 m Hg (7.5 kPa) for 20 minutes. The kettle was then heated to the desired final polymerization temperature at 285° C. or 290° C. at 1 mm Hg. Polymerization was stopped when the agitator torque reached a preset value for desired polymer molecular weight. The time from the moment vacuum reached 1 mm Hg to the stopping time was recorded in the following table as the final polymerization time (minutes). The hot polymer was quenched in water at ambient temperature, then dried and crystallized in a vacuum oven at 90° C. for 1 hour. The crystallized polyethylene terephthalate resin was grounded to flake, which was dried in the vacuum oven at 90° C. for one more hour, then analyzed for chemical properties and physical properties.

As shown in Table 2, without titanium dioxide, only 7 to 10 ppm titanium catalyst was needed, for a polycondensation reaction at 285° C., to produce polyester having a sufficient degree of polymerization, measured by I.V.

However, when the polymerization mixture contained 0.3% by weight of uncoated LW-S-U titanium dioxide, 15 to 20 ppm of titanium catalyst was needed to achieve a sufficient degree of polymerization. Thus, the amount of titanium catalyst needed with the uncoated LW-S-U titanium oxide was about double the amount of catalyst needed in the reaction that did not contain titanium dioxide.

When the polymerization mixture contained 1.5% of uncoated LW-S-U titanium dioxide, the polymerization rate with 30 ppm titanium catalyst was slow. However, when the polymerization mixture contained R-668 coated titanium dioxide, reactivity was similar to the polymer produced without the presence of titanium dioxide.

TABLE 2

| Ti Ppm | TiO$_2$ Type (weight %) | Phosphor (ppm) | Temp ° C. | Time (min) | I.V. | L color | b color |
|---|---|---|---|---|---|---|---|
| 7 | None | H$_3$PO$_4$ (7) | 285 | 80 | 0.704 | 80.0 | 9.69 |
| 10 | None | H$_3$PO$_4$ (7) | 285 | 70 | 0.708 | 79.2 | 11.0 |
| 15 | LW-S-U (0.3%) | H$_3$PO$_4$ (7) | 290 | 100 | 0.673 | 80.0 | 8.10 |
| 15 | LW-S-U (0.3%) | None | 290 | 85 | 0.661 | 80.0 | 9.49 |
| 15 | LW-S-U (0.3%) | HMP (20) | 285 | 110 | 0.740 | 81.1 | 6.91 |
| 20 | LW-S-U (0.3%) | TPP (40) | 285 | 90 | 0.666 | 78.7 | 6.82 |
| 30 | LW-S-U (1.5%) | H$_3$PO$_4$ (7) | 285 | 80 | 0.676 | 78.5 | 5.68 |
| 25 | LW-S-U (1.5%) | None | 290 | 95 | 0.728 | 77.5 | 6.75 |
| 30 | LW-S-U (1.5%) | H$_3$PO$_4$ (7) | 290 | 110 | 0.678 | 76.7 | 5.79 |
| 30 | LW-S-U (1.5%) | None | 290 | 170 | 0.629 | 79.7 | 6.36 |
| 30 | LW-S-U (1.5%) | HMP (20) | 285 | 130 | 0.753 | 78.0 | 6.51 |
| 10 | R-668 (1.5%) | HMP (20) | 285 | 60 | 0.732 | 82.6 | 8.75 |

Example 2

In this example, the batch polymerization process as the same as that in Example 1.

The titanium catalyst solution was a complex containing 1.57% Ti and with Ti:P:pTSA molar ratio 1:1:0.25. Ti was from TPT (tetra isopropyl titanate), was from phenyl phosphinic acid, and PTSA is p-toluenesulfonate.

As shown in Table 3, when titanium dioxide was not present in the polymerization mixture at 290° C., only 7 ppm of titanium catalyst was needed to produce a polyester having a sufficient I.V. When the polymerization mixture contained 0.3% by weight of uncoated titanium dioxide LW-S-U, 15 ppm of titanium catalyst was needed. In addition, when the polymerization mixture contained 1.5% of uncoated titanium dioxide LW-S-U, 30 to 40 ppm titanium catalyst was needed. However, when the polymerization mixture contained 1.5% by weight of coated titanium dioxide, such as R-706, R-700, R-900, only 10 ppm titanium catalyst was necessary to achieve a comparable I.V.

TABLE 3

| Ti ppm | TiO$_2$ Type (weight %) | Phosphor (ppm) | Temp ° C. | Time (min) | I.V. | L color | b color |
|---|---|---|---|---|---|---|---|
| 7 | None | None | 290 | 35 | 0.688 | 79.5 | 9.09 |
| 7 | None | H$_3$PO$_4$ (7) | 290 | 100 | 0.661 | 76.0 | 6.66 |
| 15 | LWSU (0.3%) | None | 290 | 65 | 0.681 | 80.6 | 8.63 |

TABLE 3-continued

| Ti ppm | TiO$_2$ Type (weight %) | Phosphor (ppm) | Temp ° C. | Time (min) | I.V. | L color | b color |
|---|---|---|---|---|---|---|---|
| 15 | LWSU (0.3%) | H$_3$PO$_4$ (7) | 290 | 95 | 0.674 | 79.8 | 7.69 |
| 40 | LWSU (1.5%) | H$_3$PO$_4$ (7) | 290 | 60 | 0.710 | 77.4 | 6.03 |
| 30 | LWSU (1.5%) | None | 290 | 80 | 0.723 | 78.2 | 5.25 |
| 10 | LOCR-SM (1.5%) | None | 285 | 50 | 0.694 | 79.3 | 7.67 |
| 10 | LC-S (1.5%) | None | 285 | 90 | 0.694 | 82.3 | 9.04 |
| 10 | LC-S (1.5%) | H$_3$PO$_4$ (7) | 285 | 85 | 0.697 | 82.6 | 8.60 |
| 10 | LC-S (1.5%) | H$_3$PO$_4$ (14) | 285 | 60 | 0.713 | 81.9 | 8.44 |
| 30 | R931 (1.5%) | None | 290 | 30 | 0.695 | 83.2 | 12.3 |
| 10 | R706 (1.5%) | None | 285 | 45 | 0.606 | 83.6 | 8.11 |
| 10 | R900 (1.5%) | None | 285 | 80 | 0.720 | 85.9 | 6.65 |
| 10 | R700 (1.5%) | None | 285 | 85 | 0.706 | 83.9 | 8.10 |
| 10 | R900 (1.5%) | H$_3$PO$_4$ (7) | 285 | 70 | 0.708 | 85.3 | 8.04 |
| 10 | R700 (1.5%) | H$_3$PO$_4$ (7) | 285 | 70 | 0.708 | 85.3 | 8.04 |

Example 3

Polyethylene terephthalate fibers were produced in a continuous process pilot plant from terephthalic acid (TPA) as follows. The polyester esterification, polycondensation, and spinning processes are well known to one skilled in the art and, thus, only a brief description is provided.

A TPA slurry tank was continuously charged with about 47 kg/hour of TPA and ethylene glycol. The charge rate was controlled by a powder screw feeder to obtain desired polymer flow rate of 54.4 kg/hour. The ethylene glycol flow rate was controlled by a mass flow meter such that the molar ratio of ethylene glycol and TPA was 2.2. The ethylene glycol was a mixture of virgin glycol and recycled glycol from the condensed vapor from esterifier and prepolymerizers and finisher. The temperature in the slurry tank was about 80° C. The TPA slurry was injected into a recirculating esterifier at a rate to keep desired polymer flow rate and constant oligomer liquid level in the esterifier. The temperature in the esterifier was controlled at 284° C. The vapor from the esterifier was condensed and separated into ethylene glycol and water, the glycol was mixed with the condensed glycol from the vapor from prepolymerizers and finisher, and then mixed with virgin glycol and charged into the TPA slurry.

The oligomer from the esterifier had a degree of polymerization 5 to 10. Additives such as catalyst, titanium dioxide slurry, inhibitor and color control agent, were injected into the oligomer line before the first prepolymerizer ("flasher"). The injection rate was controlled by meter pumps and calibrated by burette check to obtain the desired concentrations in polymer. A 1% Sb solution or 0.1% Ti solution was injected into oligomer line followed by a static mixer to obtain the desired catalyst concentration in the polymerization mixture.

Antimony glycolate solution was prepared as follows. Antimony glycolate (1.421 kg) obtained from Elf Atochem (Carollton, Ky., U.S.A.) was mixed with ethylene glycol (81.6 kg) in a mix tank. The mixture was agitated, heated to 100° C., and kept at 100° C. for 30 minutes. The antimony glycolate was completely dissolved in the glycol, the solution contained 1% Sb.

Titanium glycolate catalyst containing titanium 0.1% was prepared as follows. Tetraisopropyl titanate (TPT; from E. I. Du Pont, Wilmington, Del., U.S.A.; 270 grams) was slowly added to agitated ethylene glycol (45.1 kg) at ambient temperature.

Three types of 20% titanium dioxide in ethylene glycol slurry were compared as follows. The compositions of these titanium dioxide delusterants are provided in Table 1 above. Uncoated anatase titanium dioxide LW-S-U was mixed with ethylene glycol to obtain a premix slurry of 55% by weight, dispersing agent potassium tripolyphosphate (KTPP) was added at 0.15% of titanium dioxide. The premix slurry was sand milled two passes, diluted with ethylene glycol to 22% and filtered, and then diluted further to 20%. Coated anatase titanium dioxide LC-S was mixed with ethylene glycol to obtain a premix slurry of 60% by weight, which was two-pass sand milled and then diluted with ethylene glycol to 20%. Coated rutile titanium dioxide R-668 in ethylene glycol slurry 20% was prepared the same way as LC-S titanium dioxide slurry. For semidull and clear polymers, the 20% titanium dioxide slurries were further diluted in ethylene glycol to 10% and 5%, respectively.

The titanium dioxide slurry was injected into an oligomer line followed by a static mixer. For clear polymer, the 5% titanium dioxide in ethylene glycol slurry was injected to obtain 0.025 to 0.045% titanium dioxide in polymer. For semidull polymer, the 10% titanium dioxide in ethylene glycol was injected to obtain 0.25 to 0.35% titanium dioxide in polymer. For dull polymer, the 20% titanium dioxide in ethylene glycol was injected to obtain 1.4 to 1.6% titanium dioxide in polymer.

Di(polyoxyethylene) hydroxymethyl phosphonate ("Victastab" HMP, from Akzo Nobel, Louisville, Ky., U.S.A., 1.521 kg) was added to 80.3 kg of ethylene glycol in an agitated mix tank at ambient temperature to make a solution containing 0.158% phosphorus. Similarly, triethyl phosphonoacetate (TEPA, from Albright & Wilson America, Richmond, Va., U.S.A.; 263 grams) was added to 22.7 kg of ethylene glycol in an agitated mix tank at ambient temperature to make a solution containing 0.158% phosphorus. Triphenyl phosphite (TPP, from Aldrich, Chemical, Milwaukee, Wis., U.S.A.; 360 grams) was added to 22.3 kg of ethylene glycol in an agitated mix tank and heated at 100° C. for 60 minutes and then kept at 60° C. to make a solution containing 0.158% phosphorus. 5% $H_3PO_4$ in ethylene glycol solution (2.27 kg) was added to 20.4 kg of ethylene glycol to make a solution containing 0.5% $H_3PO_4$ or 0.158% phosphorus. The additive injection sequence in the oligomer line was titanium catalyst solution, $TiO_2$ slurry, and then phosphorous solution. There was a static mixer after each additive injection.

In the last item, carbazole violet pressed cake (from Sun Chemical Corp, Cincinnati, Ohio, U.S.A.; 21.8 grams; containing 20% to 30% carbazole violet) was mixed with ethylene glycol (22.7 kg). This slurry was injected into oligomer line to obtain 5 ppm carbazole violet in polymer to reduce polymer b color (less yellow).

The oligomer was pumped to the first prepolymerizer ("flasher"), which was controlled at 275° C. and absolute pressure 110 mm Hg (14.7 kPa). The prepolymer from the flasher flowed into the second prepolymerizer ("PP") and then to a final polymerizer ("finisher"). The PP was controlled at 280° C. and 30 mm Hg (4 kPa). The finisher was controlled at 285° C. at an absolute pressure controlled by an online melt viscometer, which was used to determine polymer molecular weight and calibrated by polymer solution viscosity in a laboratory. The evaporated glycol and water from the two prepolymerizers and finisher were condensed and mixed with the recycle glycol from esterifier, and then mixed with virgin glycol and metered and fed into the TPA slurry tank.

The polymer from the finisher was pumped to a spinning machine. The polymer transfer line temperature was controlled at 285° C. Partially oriented yarn (POY) of 34 filaments of round cross section with total denier of 265 g/9000 m was wound to a tube at 3283 meters/min, and 8 tubes were wound simultaneously. The wound tubes were taken away from the winding machine hourly. Polymer flow rate in the spinning pack was controlled by a meter pump and adjusted to obtain the desired denier. Polymer flow rate in the spinning pack was about 46.4 kg/hour. The ballast polymer which did not flow through spinning machine was pumped to a waste drum.

Polymer samples were taken in a spinning machine before finishes were applied, which were analyzed in the laboratory for intrinsic viscosity (I.V.) and component concentrations such as $TiO_2$, P, Sb, Mn, Co. The POY tubes were analyzed for color in a Hunterlab calorimeter D25M-9.

The results are provided in Table 4 below. This example illustrates that when uncoated titanium dioxide LW-S-U was in the polymer, an antimony catalyst did not lose activity, while a titanium catalyst lost activity. The polymer containing LW-S-U titanium dioxide 1.5% by weight required 6 to 8 times more titanium catalyst than the polymer containing LW-S-U titanium dioxide 0.035%. However, when the titanium dioxide was coated with aluminum oxide or silicon dioxide, the titanium catalyst was not deactivated by the titanium dioxide.

TABLE 4

| | $TiO_2$ Type (weight %) | Phosphorous (P ppm) | Finisher Pressure mm Hg | I.V. | L color | b color |
|---|---|---|---|---|---|---|
| Sb (220) | LW-S-U (0.035) | $H_3PO_4$ (7) | 6.90 | 0.686 | 78.2 | 3.40 |
| Sb (200) | LW-S-U (0.34) | $H_3PO_4$ (10) | 5.36 | 0.685 | 84.1 | 0.74 |
| Sb (200) | LW-S-U (1.50) | $H_3PO_4$ (10) | 4.70 | 0.673 | 87.0 | 0.98 |
| Sb (200) | LW-S-U (1.50) | TEPA (20) | 5.66 | 0.665 | 87.4 | 0.79 |
| Ti (10) | LW-S-U (0.035) | TPP (40) | 2.18 | 0.674 | 80.0 | 3.01 |
| Ti (10) | LW-S-U (0.035) | KTPP (5) | 4.52 | 0.679 | 80.8 | 3.82 |
| Ti (8) | LW-S-U (0.035) | HMP (20) | 2.34 | 0.683 | 80.3 | 4.49 |
| Ti (10) | LW-S-U (0.035) | HMP (24) | 4.35 | 0.676 | 81.1 | 3.31 |
| Ti (20) | LW-S-U (0.31) | HMP (20) | 2.67 | 0.675 | 86.7 | 1.96 |
| Ti (60) | LW-S-U (1.50) | None | 1.87 | 0.668 | 87.3 | 2.14 |
| Ti (60) | LW-S-U (1.50) | TPP (20) | 1.67 | 0.658 | 87.4 | 1.63 |
| Ti (60) | LW-S-U (1.50) | HMP (20) | 1.89 | 0.666 | 87.5 | 1.48 |
| Ti (80) | LW-S-U (1.50) | HMP (20) | 4.93 | 0.688 | 87.2 | 2.96 |
| Ti (5) | LC-S (1.50) | HMP (20) | 4.25 | 0.686 | 86.8 | 3.82 |
| Ti (5) | R-668 (1.50) | HMP (20) | 2.80 | 0.671 | 89.4 | 3.89 |
| Ti (5)* | R-668 (1.50) | HMP (20) | 2.32 | 0.673 | 87.1 | 1.58 |

*Toner was added to the last case at 5 ppm of polymer to reduce polymer b color.

It is to be understood that the above described embodiments are illustrative only and that modification throughout may occur to one skilled in the art. Accordingly, this invention is not to be regarded as limited to the embodiments disclosed herein.

What is claimed is:

1. A process for producing a polyester, said process comprising:

polymerizing a polymerization mixture comprising (i) a carbonyl compound or an oligomer of said carbonyl compound and (ii) a glycol, in the presence of a titanium catalyst composition, to produce said polyester, wherein a coated titanium dioxide comprising a titanium dioxide and a coat is added before or during said polymerizing.

2. The process of claim 1 wherein said titanium dioxide is rutile or anatase.

3. The process of claim 1 wherein said titanium catalyst composition is in a solid form or a liquid form.

4. The process of claim 1 wherein said titanium catalyst composition comprises $Ti(OR)_4$, wherein each R is independently selected from the group consisting of an alkyl radical, a cycloalkyl radical, an aralkyl radical, and a combination of two or more thereof, and each R contains from 1 to 30 carbon atoms per radical.

5. The process of claim 1 wherein said titanium catalyst composition comprises at least one of titanium glycolate or titanic acid.

6. The process of claim 1 wherein said titanium catalyst composition is in the form of a solution or a slurry and comprises at least one of glycol or water.

7. The process of claim 1 wherein said titanium catalyst composition further comprises a cobalt cocatalyst, an aluminum cocatalyst, an antimony cocatalyst, a manganese cocatalyst, a zinc cocatalyst, or a combination of two or more thereof.

8. The process of claim 1 wherein said coat comprises an aluminum compound, a silicon compound, a manganese compound, a phosphorous compound, an antimony compound, a cobalt compound, an organic compound, or a combination of two or more thereof.

9. The process of claim 8 wherein said coat comprises polyethylene oxide, trimethylolpropane, polyvinylpyrrolidone, polyvinyl alcohol, or a combination of two or more thereof.

10. The process of claim 8 wherein said coat comprises at least one of an aluminum oxide, a silicon oxide, a potassium oxide, an antimony oxide, or a manganese oxide.

11. The process of claim 1 wherein said titanium dioxide is 70 to 99.5% by weight of said coated titanium dioxide.

12. The process of claim 1 wherein said coat is 0.5 to 30% by weight of said coated titanium dioxide.

13. The process of claim 1 wherein said coated titanium dioxide is in the form of a slurry.

14. The process of claim 13 wherein said coated titanium dioxide further comprises a dispersing agent.

15. The process of claim 1 wherein said coated titanium dioxide is added:

before, during, or after an esterification of said carbonyl compound or said oligomer of said carbonyl compound;

before, during, or after a transesterification of aid carbonyl compound or said oligomer of said carbonyl compound; or before or during a polycondensation of said carbonyl compound or said oligomer of said carbonyl compound.

16. The process of claim 1 wherein:

said carbonyl compound comprises terephthalic acid, isophthalic acid, napthalic acid, succinic acid, adipic acid, phthalic acid, glutaric acid, oxalic acid, dimethyl adipate, dimethyl phthalate, dimethyl terephthalate, dimethyl glutarate, or a combination of two or more thereof;

said glycol comprises ethylene glycol, propylene glycol, isopropylene glycol, butylene glycol, 1-methyl propylene glycol, pentylene glycol, diethylene glycol, triethylene glycol, polyoxyethylene glycol, polyoxypropylene glycol, polyoxybutylene glycol, or a combination of two or more thereof.

17. The process of claim 1 wherein said polymerizing further comprises contacting a phosphorous compound with said polymerization mixture.

18. The process of claim 17 wherein said phosphorus compound comprises a phosphoric acid or a salt thereof, a phosphorous acid or a salt thereof, a polyphosphoric acid or a salt thereof, a phosphonate ester, a pyrophosphoric acid or salt thereof, a pyrophosphorous acid or salt thereof, or a combination of two or more thereof.

19. The process of claim 17 wherein the phosphorous compound is contacted together with or separate from said titanium catalyst composition.

* * * * *